United States Patent Office 3,445,474
Patented May 20, 1969

3,445,474
3 - HALO - 4 - (LOWER-ALKANOYLOXY) - 1-
(LOWER - ALKYL) - 4-PHENYLPIPERIDINES
AND INTERMEDIATES
Philip M. Carabateas, Schodack, N.Y., assignor to Sterling Drug Inc., New York, N.Y., a corporation of Delaware
No Drawing. Filed Oct. 20, 1965, Ser. No. 499,026
Int. Cl. C07d 31/36
U.S. Cl. 260—294.3                8 Claims

ABSTRACT OF THE DISCLOSURE 3-halo-4-(lower-alkanoyloxy)-1-(lower-alkyl)-4-phenylpiperidines, having central nervous stimulant activity, are prepared in several steps by first reacting 1-(lower-alkyl)-4-phenyl-1,2,5,6-tetrahydropyridine with N-bromoacetamide in an acidic aqueous medium to form a 1-(lower-alkyl)-3-bromo-4-phenyl-4-piperidinol, next reacting the 3-bromo compound with aqueous alkali to form 1-(lower-alkyl)-3,4-epoxy-4-phenylpiperidine, then reacting the epoxy compound with a hydrogen halide to form 1-(lower-alkyl)-3-halo-4-phenyl-4-piperidinol as its hydrohalide salt and reacting the latter with a lower-alkanoylating agent, preferably a lower-alkanoic anhydride or a lower-alkanoyl halide.

---

This invention relates to compositions of matter known in the art of chemistry as substituted-piperidines.

The invention sought to be patented, in one composition aspect, resides in the class of compounds which I designate 3-halo-4-(lower-alkanoyloxy)-1-(lower-alkyl)-4-phenylpiperidines. Accordingly, I depict these compounds as having halo attached to the 3-position of 4-(lower-alkanoyloxy)-1-(lower-alkyl)-4-phenylpiperidines. The tangible embodiments of this composition aspect of the invention, when tested according to standard pharmacological evaluation procedures in animals, have been found to possess the inherent applied use characteristics of exerting a central nervous stimulant effect in animal organisms. In contrast, corresponding known compounds having a 3-methyl substituent or no 3-substituent are known to have analgesic activity, a property not possessed by my compounds.

Without limiting the generality of the foregoing, illustrative and preferred embodiments of my 3-halo-4-(lower-alkanoyloxy)-1-(lower-alkyl) - 4 - phenylpiperidines are those of Formula I

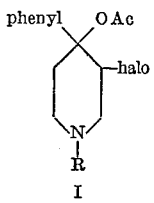

I where Ac is lower-alkanoyl and R is lower-alkyl. Here and elsewhere throughout this specification, it will be understood the benzene ring of phenyl can bear any number and kind of substituents such as would occur to the man skilled in organic chemistry; solely for illustration, and without limiting the generality of the foregoing, such substituents include lower-alkyl, lower-alkoxy, halo (chloro, bromo, iodo or fluoro), lower-alkylmercapto, and the like, the term "lower" in each instance designating 1–6 carbon atoms inclusive.

The term "halo," as used throughout this specification, e.g., as the 3-substituent in Formula I above, includes chloro, bromo, iodo and fluoro.

Each of the terms "lower-alkyl" and "lower-alkanoyl," as used throughout this specification, e.g., as the meanings for "R" and "Ac" in Formula I, means alkyl and alkanoyl radicals having from one to six carbon atoms which can be arranged as straight or branched chains, among which are, for purposes of illustration but without limiting the generality of the foregoing, methyl, ethyl, n-propyl, isopropyl, 2-butyl and n-hexyl for lower-alkyl; and, by formyl, acetyl, propionyl (n-propanoyl), isobutyryl (2-methyl-n-propanoyl) and caproyl (n-hexanoyl) for lower-alkanoyl.

The invention sought to be patented, in another composition aspect, resides in the class of compounds which I designate 3-halo-1-(lower-alkyl)-4-phenyl-4-piperidinols. Accordingly, I depict these compounds as having halo attached to the 3-position of 1-(lower-alkyl)-4-phenyl-4-piperidinols. These compounds are useful in the preparation of my above-described 3-halo-4-(lower-alkanoyloxy)-1-(lower-alkyl)-4-phenylpiperidines and are useful in studying the reaction of 3,4-epoxy-1-(lower-alkyl)-4-phenylpiperidines with hydrogen halide.

Another composition aspect of the invention sought to be patented resides in the class of compounds which I designate 3,4-epoxy-1-(lower-alkyl) - 4 - phenylpiperidines. Accordingly, I depict these compounds as having oxygen attached to each of the 3- and 4-positions of 1-(lower-alkyl)-4-phenylpiperidines. These compounds are useful in the preparation of my above-described 3-halo-1-(lower-alkyl)-4-phenyl-4-piperidinols and are useful in investigating the reaction of 1-(lower-alkyl)-4-phenyl-1,2,5,6-tetrahydropyridine with N-bromoacetamide in an acidic aqueous medium.

The 3-halo-4-(lower-alkanoyloxy)-1-(lower-alkyl) - 4-phenylpiperidines of my invention are prepared by reacting a 3-halo-1-(lower-alkyl)-4-phenyl-4-piperidinol with a lower-alkanoylating agent, preferably a lower-alkanoic anhydride or a lower-alkanoyl halide. When a lower-alkanoyl anhydride is used as the acylating agent, the reaction is carried out preferably by heating the anhydride and the intermediate 3-halo-1-(lower-alkyl)-4-phenyl-4-piperidinol preferably with but optionally without an inert solvent such as benzene, toluene or pyridine. While the reaction was found to proceed rapidly by heating the reactants on a steam bath, other temperatures in the range of about 0° to 150° C., preferably between 30° and 100° C., can be used. Alternatively, the acylation can be carried out by reacting a lower-alkanoyl halide with the 3-halo-1-(lower-alkyl)-4-phenyl-4-piperidinol preferably at room temperature, i.e., about 20–25° C., preferably in a dry solvent inert under the conditions of the reaction, e.g., chloroform; alternatively, the reaction with the alkanoyl halide can be carried out using higher temperatures, e.g., 50–70° C.

The intermediate 3-halo-1-(lower-alkyl) - 4 - phenyl-4-piperidinols and 3,4-epoxy-1-(lower-alkyl)-4-phenylpiperidines were prepared as follows: 3-bromo-1-(lower-alkyl)-4-phenyl-4-piperidinol was prepared by reacting a 1-(lower-alkyl)-4-phenyl-1,2,5,6-tetrahydropyridine with N-bromoacetamide in an acidic aqueous medium; said 3-bromo compound was reacted with aqueous alkali to form the 3,4-epoxy-1-(lower-alkyl)-4-phenylpiperidine; and, reaction of said 3,4-epoxy compound with the appropriate hydrogen halide yielded the corresponding 3-halo-1-(lower-alkyl)-4-phenyl-4-piperidinol, e.g., the 3-chloro-1-(lower-alkyl)-4-phenyl-4-piperidinol using hydrogen chloride. These reactions are illustrated hereinbelow.

The compounds of my invention are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. In practicing my invention, I found it convenient to employ the hydrochloride or hydrobromide salt. However, other appropriate pharmacodynamically acceptable salts within the scope of the invention are those derived from mineral acids such as hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ether or ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

The physical embodiments of the invention, both intermediates and final products, are white, crystalline solids, soluble in ethyl alcohol; and, both 4-piperidinol intermediates and final products are soluble in water in the form of acid-addition salts. The final products possess the inherent applied use characteristics of exerting a stimulatory effect in animal organisms, as evidenced by pharmacological evaluation in mice according to standard test procedures described hereinbelow.

The foregoing is a general description of the manner and process of making and using the invention so as to enable any persons skilled in the art of chemistry to make and use the same.

The molecular structures of the compounds of the invention are established by their mode of synthesis and corroborated by the correspondence of calculated and found values for the elementary analyses for representative examples.

The best mode contemplated by the inventor of carrying out his invention will now be set forth, as follows:

Stir 17.3 g. of 1-methyl-4-phenyl-1,2,5,6-tetrahydropyridine in a mixture of 100 g. of ice and 5.2 ml. of concentrated sulfuric acid until the pyridine derivative dissolves. Add with stirring to the solution 13.8 g. of N-bromoacetamide, followed by 0.5 ml. of concentrated sulfuric acid. Stir the reaction mixture for thirty minutes, add another 0.5 ml. portion of concentrated sulfuric acid and stir the solution for an additional thirty minutes at 35° C. Cool the solution, add 35% aqueous sodium hydroxide solution to make it basic, extract the alkaline mixture with ether and dry the ether extract over anhydrous sodium sulfate. Add to the ether solution containing 3,4-epoxy-1-methyl-4-phenylpiperidine an ether solution containing hydrogen bromide, decant the ether from the separated product, 3-bromo - 1 - methyl-4-phenyl-4-piperidinol as its hydrobromide, and immediately add to the piperidinol 75 ml. of propionic anhydride. After the piperidinol dissolves (about thirty minutes), allow the solution to stand overnight. Collect the precipitated white solid and recrystallize it from methanol-ethyl acetate to yield 20.5 g. (50.4% of yield) of 3-bromo-1-methyl-4-phenyl-4-propionoxypiperidine as its hydrobromide, M.P. 166.8–169.0° C. (corr.).

*Analysis*—Calcd. for $C_{15}H_{20}BrNO_2 \cdot HBr$: C, 44.24; H, 5.20; Br, 39.26. Found: C, 44.04; H, 5.01; Br, 39.00.

The above intermediate 3,4-epoxy-1-methyl-4-phenylpiperidine is obtained by distilling its above-referred-to ether solution in vacuo to remove the ether.

3-chloro-1-methyl-4-phenyl-4-propionoxypiperidine hydrochloride [3.4 g., M.P. 200.0–201.0° C. (corr.) after two recrystallizations from ethyl acetate-methanol] is prepared following the above procedure described for the preparation of the corresponding 3-bromo compound using 5.2 g. of 3-chloro-1-methyl-4-phenyl-4-piperidinol as its hydrochloride (obtained as above by reacting 3,4-epoxy-1-methyl-4-phenylpiperidine with an ether solution of hydrogen chloride instead of hydrogen bromide) and 20 ml. of propionic anhydride (the reactants heated nine hours on a steam bath).

*Analysis*—Calcd. for $C_{15}H_{20}ClNO_2 \cdot Hcl$: C, 56.61; H, 6.65; Cl, 22.28. Found: C, 56.49; H, 6.45; Cl, 22.20.

The foregoing description of the invention is for purposes of illustration and does not limit the generality of the applicability of the inventive concept as herein set forth. Other 3-halo-4-(lower - alkanoyloxy) - 1 - (lower-alkyl)-4-phenylpiperidines, as well as other corresponding intermediate 3-halo-1-(lower-alkyl)-4-phenyl-4-piperidinols and 3,4-epoxy-1-(lower-alkyl)-4-phenylpiperidines, can be prepared in the manner above-described by substituting molar equivalent quantities of the desired 1-(lower-alkyl)-4-phenyl-1,2,5,6-tetrahydropyridine in the reaction with N-bromoacetamide to form said 3,4-epoxy compound, reacting the 3,4-epoxy compound with the appropriate hydrogen halide to yield the 3-halo-1-(lower-alkyl-4-phenyl-4-piperidinol, and then substituting in the acylation step for propionic anhydride the appropriate lower-alkanoic anhydride or lower-alkanoyl halide. Further illustrative compounds thus prepared are: 3,4-epoxy-1-ethyl-4-phenylpiperidine, 3,4-epoxy-1-n-hexyl-4-phenylpiperidine, 1-ethyl-3-fluoro-4-phenyl-4-piperidinol, 3-iodo-1-methyl-4-phenyl-4-piperidinol, 3-bromo-1 - n - hexyl - 4-phenyl-4-piperidinol, 1-ethyl-3-fluoro-4-n-hexanoyloxy-4-phenylpiperidine, 4-acetoxy-3-iodo -1- methyl - 4 - phenylpiperidine and 3-bromo-1-n-hexyl-4-phenyl-4-propionoxypiperidine.

My 3-halo-4-(lower-alkanoyloxy)-1-(lower - alkyl) - 4-phenylpiperidines when tested according to standard pharmacological evaluation procedures in animals have been found to possess the inherent applied use characteristics of exerting a central nervous stimulant effect in animal organisms. For example, when administered intraperitoneally to mice in the Reserpine Ptosis Reversal and Prevention Tests, as described below, these compounds were found to prevent and to reverse reserpine-induced eyelid ptosis at dose levels of about 10 to 50 mg. per kg. of body weight.

The Reserpine Ptosis Reversal Test (RPRT) is described briefly as follows: Unfasted male mice weighing 17 to 30 grams are grouped in cages of eight animals each. The mice are injected intraperitoneally with 2 mg./kg. of reserpine, and three hours later with test agent. One-half hour after administration of test agent the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses until an inactive dose is found.

The Reserpine Ptosis Prevention Test (RPPT) is described briefly as follows: Unfasted male mice weighing 17 to 30 grams are grouped in cages of eight animals each. The mice are injected intraperitoneally with the test agent. Two hours later the mice are injected intraperitoneally with 2 mg./kg. of reserpine. Three hours after administration of reserpine the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses until an inactive dose is found.

For purpose of illustration but without limiting the generality of the foregoing, compounds having activity as central nervous stimulants are given as follows, with RPRT and RPPT designating, respectively, the Reserpine Ptosis Reveral and Prevention Test: 3-chloro-1-methyl-4-phenyl-4-propionoxypiperidine hydrochloride (RPRT, 50 mg./kg.; RPPT, 10 mg./kg.); and, 3-bromo-1-methyl-4-phenyl-4-propionoxypiperidine hydrobromide (RPRT, 50 mg./kg.; RPPT, 50 mg./kg.).

I claim:
1. 3-halo-4-(lower - alkanoyloxy-1 - (lower - alkyl) - 4-phenylpiperidine.
2. 3-bromo-1-methyl-4-phenyl-4-n-propanoyl-oxypiperidine.
3. 3-chloro-1-methyl-4-phenyl-4-n-propanoyl-oxypiperidine.
4. 3-halo-1-(lower-alkyl)-4-phenyl-4-piperidinol.
5. 3-bromo-1-methyl-4-phenyl-4-piperidinol.
6. 3-chloro-1-methyl-4-phenyl-4-piperidinol.
7. 3,4-epoxy-1-(lower-alkyl)-4-phenylpiperidine.
8. 3,4-epoxy-1-methyl-4-phenylpiperidine.

References Cited

Lyle et al., J. Org. Chem., 30(2), Februray 1965, pp. 394–6.

HENRY R. JILES, *Primary Examiner.*

E. D. LEWIS, *Assistant Examiner.*

U.S. Cl. X.R.
260—294.7, 999

PO-1050
(5/69)

UNITED STATES PATENT OFFICE
CERTIFICATE OF CORRECTION

Patent No. 3,445,474  Dated May 20, 1969

Inventor(s) Philip M. Carabateas

It is certified that error appears in the above-identified patent and that said Letters Patent are hereby corrected as shown below:

Column 4, line 19, "Hcl" should read --HCl--. Column 5, line 9, "Reveral" should read --Reversal--; line 15, after "alkanoyloxy" insert --)--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents